(12) United States Patent
Lundgren

(10) Patent No.: US 6,532,727 B1
(45) Date of Patent: Mar. 18, 2003

(54) DEVICE FOR THE SUPPLY OF A LIQUID FUEL TO A BURNER MEMBER

(75) Inventor: Sten-Inge Lundgren, Finspång (SE)

(73) Assignee: Alstom Power Sweden Holding AB, Finspang (SE)

(*) Notice: Subject to any disclaimer, the term of this patent is extended or adjusted under 35 U.S.C. 154(b) by 0 days.

(21) Appl. No.: 09/700,470
(22) PCT Filed: May 12, 1999
(86) PCT No.: PCT/SE99/00817
  § 371 (c)(1),
  (2), (4) Date: May 3, 2001
(87) PCT Pub. No.: WO99/63271
  PCT Pub. Date: Dec. 9, 1999

(30) Foreign Application Priority Data

May 15, 1998 (SE) .............................................. 9801728

(51) Int. Cl.⁷ ................................................. F02C 9/26
(52) U.S. Cl. ...................................... 60/39.281; 60/734
(58) Field of Search ................................ 60/39.281, 734

(56) References Cited

U.S. PATENT DOCUMENTS

| 3,908,360 A | 9/1975 | Meyer et al. |
| 4,204,809 A | 5/1980 | Frazel |
| 5,240,405 A | 8/1993 | Schubach et al. |
| 5,752,380 A | * 5/1998 | Bosley et al. ............ 60/39.281 |

FOREIGN PATENT DOCUMENTS

JP  5-157059  6/1993

* cited by examiner

Primary Examiner—Louis J. Casaregola

(57) ABSTRACT

The invention refers to a device for the supply of a liquid fuel to a burner member (6', 6"). The device includes at least one fuel supply conduit (5', 5") and means (7, 8, 9) for controlling a fuel flow through said conduit. The control means include a pump (7) driven by a motor (8) and a control unit (9) which is arranged to control the number of revolutions of said motor (8) and thus of the pump (7).

8 Claims, 2 Drawing Sheets

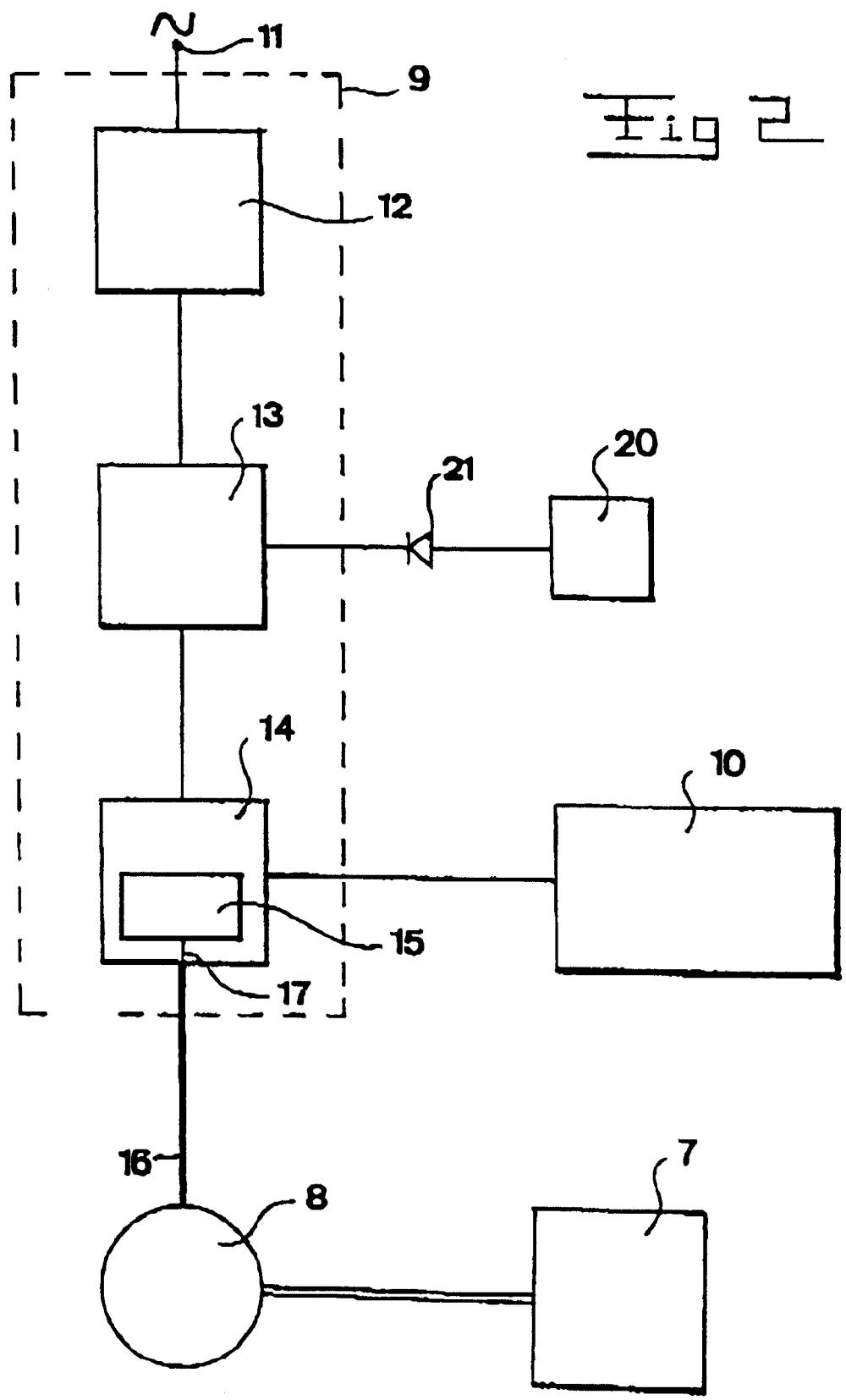

DEVICE FOR THE SUPPLY OF A LIQUID FUEL TO A BURNER MEMBER

THE BACKGROUND OF THE INVENTION AND PRIOR ART

The present invention refers to a device for the supply of a liquid fuel to a burner member according to the preamble of claim 1.

Such fuel supply devices are known, for instance for the combustion of oil in a combustion chamber of a gas turbine device. According to conventional technique, a pump is thereby utilized, which operates at a constant speed and at a relatively high pressure dimensioned for the maximum effect of the gas turbine device. The control for adjusting the fuel quantity supplied to the combustion chamber is performed by means of a controllable throttle valve and a by-pass conduit returning surplus fuel to a drainage vessel or the like. In order to maintain the accuracy, the flow quantity supplied or the position of the throttle valve is measured, wherein the measured value is fed back.

However, such a throttling and recirculation of fuel results in a loss of the energy which has been utilized for increasing the pressure of the fuel in the fuel supply conduit. Since gas turbine devices normally operate at an effect which is lower than the maximum possible output effect, an unnecessary pump work will be performed during a not insignificant part of the operating time of the gas turbine device. In addition, the construction of such a supply device is rather complicated and expensive with a controllable throttle valve which normally is adjusted by means of an electro-hydraulic control system.

SUMMARY OF THE INVENTION

The object of the present invention is to remedy the disadvantages mentioned above and provide a fuel supply device having a higher efficiency than fuel supply devices previously known.

This object is obtained by the device initially defined, which is characterized in that said control means includes a pump driven by a motor and a control unit arranged to control the number of revolutions of said motor and thus of the pump. By controlling the number of revolutions of the motor and the pump in such a manner, the fuel supply may be controlled in a very easy and rapid manner. The number of revolutions of the motor and the pump may thus be adjusted to the pump effect required for feeding the fuel to the combustion chamber and consequently the motor will always operate at a number of revolutions which corresponds to the fuel quantity actually supplied to the combustion chamber. Furthermore, the device according to the invention provides possibilities to connect the control unit to the overall control system of the burner member of for instance a gas turbine device in an easy manner and in such a way adjust the number of revolutions of the motor to the fuel quantity required at a demanded load.

According to an embodiment of the invention, the pump includes a displacement pump. A displacement pump, for instance a piston pump, a screw pump or the like, normally has a defined relation between the number of revolutions of the pump and the flow through the pump, which enables the control of the fuel quantity supplied in an exact manner.

According to a further embodiment of the invention, the motor includes an alternating current motor. The number of revolutions of alternating current motors may be controlled in an easy manner by controlling the frequency of the motor voltage. Thereby, the motor includes an asynchronous motor and the control unit a frequency converter, advantageously a so-called static frequency converter, SFC. Such a control has a high accuracy and requires no measurement and/or feedback of the actual flow or number of revolutions of the motor.

According to a further embodiment of the invention, the control unit includes sensor members arranged to sense at least one motor parameter and an adjustment unit arranged to adjust the electric effect supplied to the motor in response to said sensed motor parameter. By means of such an adjustment unit, it is possible to provide an optimum model of the connected asynchronous motor and obtain a high control velocity, i.e. to control the number of revolutions of the motor and the pump in a very quick and accurate manner. Such a technique enables closing and acceleration of the fuel flow within 200–300 ms.

According to an advantageous application of the invention, the burner member is comprised by a gas turbine device. A calculating unit may thereby be arranged to calculate a desired fuel flow for each load condition of the gas turbine device and to calculate the desired number of revolutions of the motor for each flow, wherein the control unit is arranged to control the number of revolutions with regard to said calculations. The control may thus be based on solely the calculated value of the number of revolutions and no measurement of any parameter of the actual fuel flow is needed.

According to a further embodiment of the invention, a source is arranged to provide liquid fuel, wherein at least two fuel supply conduits extend from said source which each includes said control means. Advantageously, one of said fuel supply conduits may thereby be arranged to supply fuel to a pilot burner of said burner member and the other of said fuel supply conduits may be arranged to supply fuel to a main burner of said burner member.

BRIEF DESCRIPTION OF THE DRAWINGS

The present invention is now to be described more closely by means of an embodiment and with reference to the drawings attached, in which FIG. 1 discloses schematically a view of a fuel supply device according to the invention and FIG. 2 discloses schematically a view of a part of the device in FIG. 1.

DETAILED DESCRIPTION OF AN EMBODIMENT OF THE INVENTION

Figure 1:
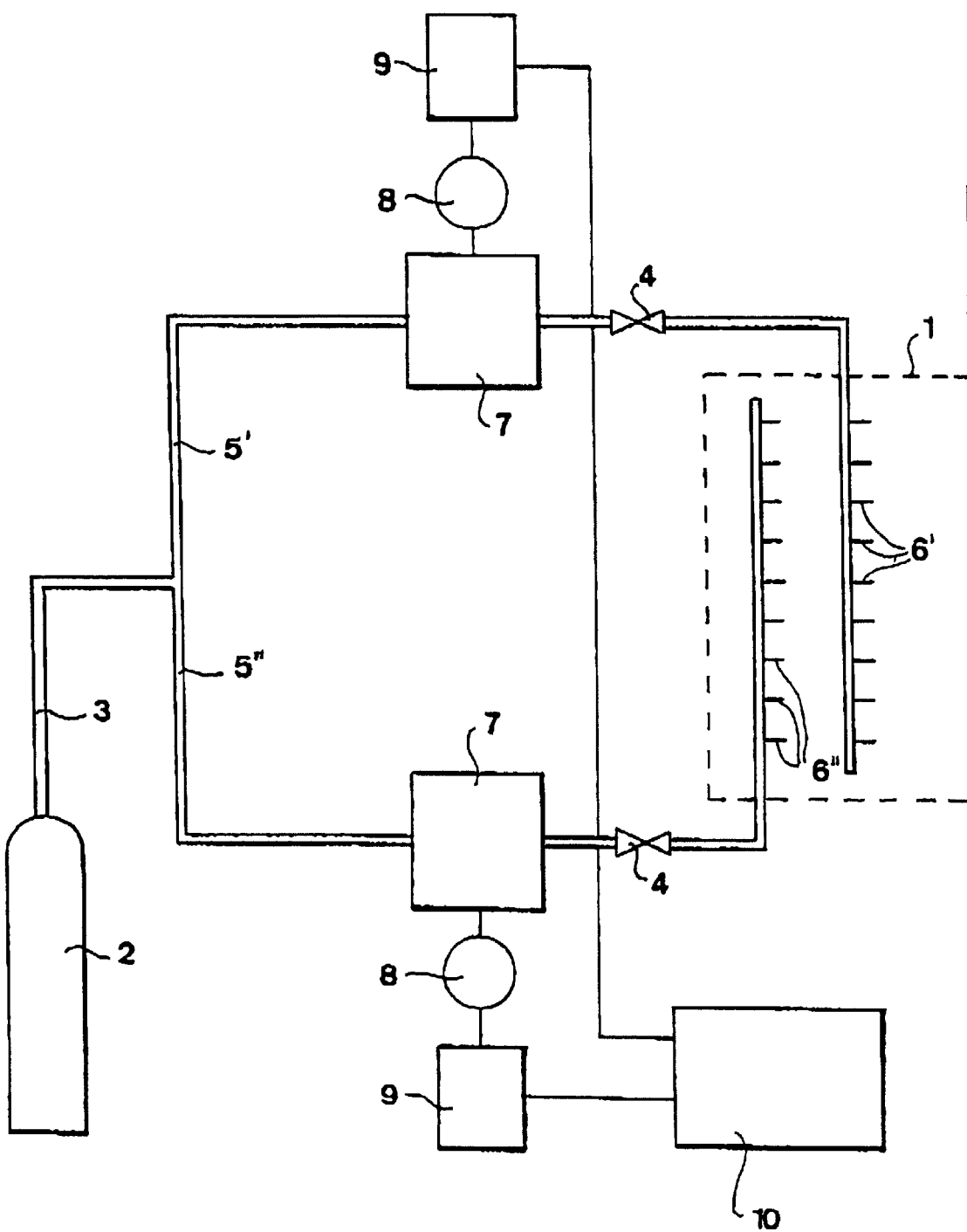

FIG. 1 discloses a fuel supply device for the supply of liquid fuel, in the following example oil, to a schematically indicated combustion chamber 1 of a gas turbine device (not disclosed). The fuel supply device disclosed is connected to a fuel source 2 via a main conduit 3. The main conduit 3 is divided into two supply conduits 5' and 5". The supply conduits 5' and 5" are arranged to feed fuel to a respective set of burner nozzles 6' and 6", respectively, which form a respective burner member in the combustion chamber 1. Each supply conduit includes an emergency stop valve 4 which may have a conventional construction. Each such burner nozzle 6', 6" may according to conventional technique include a shut-off valve (not disclosed) of the type on/off in order to either open the burner nozzle 6', 6" or close the nozzle. In the embodiment disclosed, the supply conduit 5' is arranged to supply main fuel to the combustion chamber 1 for the main combustion at high loads. The supply conduit 5" is arranged to supply a so-called pilot fuel to the combustion chamber 1 in order to support the combustion at stability problems of the flame.

According to the present invention, each fuel supply conduit 5', 5" includes a unit for the control of the fuel flow through the respective conduit 5', 5". Each such control unit includes a pump 7 which is arranged to increase the pressure of the fuel to a level of up to 100–200 bars and to pump the fuel through the respective conduit for feeding thereof to the combustion chamber 1. Each pump 7 preferably includes a so called displacement pump, for instance a screw pump, a piston pump or any similar pump device having a substantially constant relation between the number of revolutions and the flow. Each pump 7 is driven by an electric motor 8, the number of revolutions of which is controllable by means of a control unit 9. In the embodiment disclosed, the electric motor 8 includes an alternating current motor and in particular an asynchronous motor. The control unit 9 thereby includes a frequency converter and in particular a static frequency converter. By the control units disclosed, the fuel flow, i.e. the quantity of fuel which is fed into the combustion chamber 1 via the nozzles 6', 61", may be continuously controlled in an easy and efficient manner without any unnecessary pump work. Furthermore, each control unit 9 is connected to the overall control system 10 of the gas turbine device. In such a manner, the fuel flow may continuously be adjusted to the fuel quantity required for the load demanded for the time being.

FIG. 2 discloses more closely how the control unit 9 may be designed. Hereby, each control unit 9 includes an input 11 for connection to the electric alternating current network. The input 11 is connected to an AC/DC-converter 12 for converting the input alternating voltage to a direct voltage. The AC/DC-converter 12 is in turn connected to a direct current unit 13 which in turn is connected to a DC/AC-converter 14 which is arranged to convert the input direct voltage to an alternating voltage of a desired frequency. This alternating voltage is then fed to the motor 8 which is driven at a number of revolutions which depends on the actual frequency of the input alternating voltage. The DC/AC-converter 14 is connected to the overall control system 10 which delivers a setting value of number of revolutions, which depends on the load demanded and which defines the frequency of the output alternating voltage from the DC/AC-converter. The control system 10 includes a calculating unit arranged to calculate a desired fuel flow for each load condition of the gas turbine device and to calculate the desired number of revolutions of the motor for each fuel flow. The calculated number of revolutions is supplied, as mentioned above, to the DC/AC-converter 14 of the control unit 9.

Furthermore, the DC/AC-converter includes an adjustment unit 15, a so-called Direct Torque Control processor, DTC for adjusting the voltage and the current of the electric effect supplied to the electric motor 8. The adjustment unit 15 is thereby arranged to control the voltage and the current in response to one or several motor parameters, in accordance with the motor model disclosed, which may be measured via a signal conduit 17 and the conduit 16 supplying alternating voltage to the motor 8 and which for instance may include the reactance and the inductance of the motor 8.

By the device disclosed, a very accurate value of the number of revolutions and the flow following the number of revolutions is obtained merely by measuring the electric parameters of the alternating current motor 8. No feedback of any parameter of the flow is necessary.

The supply device according to the invention may in addition in an easy manner be driven by a battery 20 which may be connected directly to the direct current unit 13 and feed effect without any interruption, for instance when the network current disappears. A blocker diode 21 prevents current feed to the battery 20 from the direct current unit 13.

The present invention is not limited to the embodiment disclosed but may be varied and modified within the scope of the following claims.

Although the embodiment disclosed includes two control units, one for each fuel supply conduit 5', 5", it is clear that the invention is applicable also in the case that the fuel supply device merely includes one fuel supply conduit and one control unit.

The device disclosed is applicable to the supply of fuel and also other liquid media in a variety of different situations and to a variety of different types of combustion chambers.

What is claimed is:

1. A device for the supply of a liquid fuel to a burner member, the device comprising:
   at least one fuel supply conduit; and
   means for controlling a fuel flow through said at least one fuel supply conduit,
   wherein said means for controlling includes a positive displacement pump driven by a motor, and a control unit arranged to control a number of revolutions of said motor arid the positive displacement pump in response to a desired fuel flow,
   wherein the motor includes an asynchronous motor,
   wherein the control unit includes a static frequency converter, sensing members arranged to sense at least one motor parameter, and an adjustment unit arranged to adjust at least one electric effect from the group consisting of a voltage, a frequency of power, and a current supplied to the motor in response to said sensed at least one motor parameter and said desired fuel flow.

2. The device according to claim 1, wherein the burner member is comprised by a gas turbine device.

3. The device according claim 1, further comprising a calculating unit,
   said calculating unit being arranged to calculate the desired fuel flow for each of a plurality of load conditions of a gas turbine device and to calculate a desired number of revolutions of the motor for each of a plurality of desired fuel flows corresponding to the plurality of load conditions,
   wherein the control unit is arranged to control the number of revolutions of said motor responsive to said calculated desired fuel flow and said desired number of revolutions of the motor.

4. The device according to claim 1, further comprising:
   a source arranged to provide liquid fuel; and
   at least two fuel supply conduits extending from said source,
   wherein each of said at least two fuel supply conduits includes separate means for controlling an associated fuel flow.

5. The device according to claim 4, wherein one of said at least two fuel supply conduits is arranged to supply fuel to a pilot burner of said burner member and the other one of said at least two fuel supply conduits is arranged to supply fuel to a main burner of said burner member.

6. The device according to claim 2, further comprising a calculating unit,
   said calculating unit being arranged to calculate the desired fuel flow for each of a plurality of load conditions of a gas turbine device and to calculate a desired number of revolutions of the motor for each of a plurality of desired fuel flows corresponding to the plurality of load conditions, wherein the control unit is arranged to control the number of revolutions of said motor responsive to said calculated desired fuel flow and said desired number of revolutions of the motor.

7. The device according to claim 2, further comprising:

a source arranged to provide liquid fuel; and at least two fuel supply conduits extending from said source, wherein each of said at least two fuel supply conduits includes separate means for controlling an associated fuel flow.

8. The device according to claim 3, further comprising a source arranged to provide liquid fuel; and at least two fuel supply conduits extending from said source, wherein each of said at least two fuel supply conduits includes separate means for controlling an associated fuel flow.

* * * * *